United States Patent
Wang et al.

(10) Patent No.: US 10,409,899 B2
(45) Date of Patent: Sep. 10, 2019

(54) METHOD, DEVICE AND MOBILE TERMINAL FOR PROCESSING WEBPAGE IN NIGHT MODE

(71) Applicant: Guangzhou UCWEB Computer Technology Co., Ltd., Guangdong (CN)

(72) Inventors: Qianzhou Wang, Guangdong (CN); Jin Liang, Guangdong (CN); Xianfeng Li, Guangdong (CN); Xiaokai Ke, Guangdong (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 50 days.

(21) Appl. No.: 14/998,315

(22) Filed: Dec. 24, 2015

(65) Prior Publication Data

US 2016/0188552 A1    Jun. 30, 2016

(30) Foreign Application Priority Data

Dec. 25, 2014   (CN) .......................... 2014 1 0830793

(51) Int. Cl.
*G06F 3/00*   (2006.01)
*G06F 17/22*   (2006.01)
*G06F 17/21*   (2006.01)

(52) U.S. Cl.
CPC ........ *G06F 17/2288* (2013.01); *G06F 17/218* (2013.01); *G06F 17/227* (2013.01); *G06F 17/2247* (2013.01)

(58) Field of Classification Search
CPC .............. G06F 17/2288; G06F 17/218; G06F 17/2247; G06F 17/227
See application file for complete search history.

(56) References Cited

U.S. PATENT DOCUMENTS

2011/0238736 A1* 9/2011 Tanaka ................. G06F 9/5011
                                                   709/203
2015/0106686 A1* 4/2015 Blitzstein .......... G06F 17/30905
                                                   715/234
(Continued)

FOREIGN PATENT DOCUMENTS

CN       103258038    *  8/2013
CN       103327194    *  5/2014

OTHER PUBLICATIONS

Sunkara et al., "Rendering on browsers responsive to user head position and environmental conditions," Dec. 13, 2014, pp. 1-13.*

(Continued)

*Primary Examiner* — Kyle R Stork
(74) *Attorney, Agent, or Firm* — Alston & Bird LLP

(57) ABSTRACT

Methods, devices, and mobile terminals for webpage processing in a night mode are provided. A method may comprise the browser injecting the CSS style of night mode and the corresponding JavaScript into the main file of said webpage via the interface of network request processing as provided by the terminal operating system when the browser is loading a webpage, and the browser parsing said main file, executing said JavaScript and applying said CSS style in a night mode to the webpage elements of said webpage for display. This can effect night mode and improve a user's browsing experience while maintaining the original webpage layout.

9 Claims, 5 Drawing Sheets

(56) References Cited

U.S. PATENT DOCUMENTS

2015/0234798 A1* 8/2015 Mocanu .............. G06F 17/2247
                                                    715/236
2015/0264423 A1* 9/2015 Torgemane ............... G06F 8/30
                                                    715/719
2015/0310125 A1* 10/2015 Kinarti .................. G06F 17/227
                                                    715/235

OTHER PUBLICATIONS

Garsiel et al., "How Browsers Work: Behind the scenes of modern web browsers," Aug. 5, 2011, <https://www.html5rocks.com/en/tutorials/internals/howbrowserswork/>, pp. 1-50.*

Santiago, Rocir, "NSURLProtocol Tutorial," Sep. 3, 2014, <https://www.raywenderlich.com/59982/nsurlprotocol-tutorial>, pp. 1-15.*

* cited by examiner

METHOD, DEVICE AND MOBILE TERMINAL FOR PROCESSING WEBPAGE IN NIGHT MODE

CROSS-REFERENCE TO RELATED APPLICATION

This application claims priority to and the benefit of Chinese Patent Application Serial No. 201410830793.X, filed with the State Intellectual Property Office of P.R. China on Dec. 25, 2014, the content of which is incorporated herein by reference in its entirety.

TECHNICAL FIELD

This invention relates to the technical field of mobile communication, and in particular, to methods, devices and mobile terminals for processing webpage in night mode.

BACKGROUND

To make more convenient for a user to browse a webpage via a browser on a mobile terminal in a scene with poor illumination, browsers of most mobile terminals have night mode. Night mode is primarily implemented by two means. By the first means, the luminance of the entire browser interface (including the webpage content) is uniformly reduced, e.g. Baidu mobile phone browser. By the second means, the browser and webpage content are implemented separately. In this method, a night skin is applied to the browser while the background color of the webpage is replaced by a color with lower-luminance and the brightness of images is reduced.

Closed operating system, e.g. iOS, is used on mobile terminals. Since application of the closed operating system does not allow a third-party browser to access its own kernel (i.e. the kernel of such third-party browser) a third party usually need to use widgets provided by the closed operating system, such as UIWebView and WKWebView. These widgets may provide limited interfaces for external use and do not allow a third-party browser to make direct modification to webpage settings and webpage rendering which are determined by kernel of the third party. Therefore, only the first means is applicable to mobile terminals, resulting in lower brightness and poor display quality. The legibility of webpage content is substantially reduced accordingly. It becomes very inconvenient for user to browse webpage in a poorly illuminated environment and the browsing effects are significantly influenced.

BRIEF SUMMARY

Embodiments of the present invention may address technical problems by providing method and device for webpage processing in night mode. It may facilitate night mode, improve the display quality and enhance the user's browsing experience while maintaining layout of original webpage.

One aspect of the present invention is a method for webpage processing in night mode, wherein the method comprises: a browser injecting a CSS style of night mode and the corresponding JavaScript into a main file of said webpage via an interface of network request processing as provided by the terminal operating system when the browser is loading a webpage; and the browser parsing said main file, executing said JavaScript and applying said CSS style in a night mode to the webpage elements of said webpage for display. Additional features and embodiments are described in the detailed description and in the claims.

Embodiments of the present invention may have the following benefits: when browser loads a webpage, night mode CSS style and corresponding JavaScript are added to the main file of a webpage. When the browser parses the main file, it executes the JavaScript and applies the night mode CSS style to each webpage element to cover the original style of the webpage. In this way, it may provide better night display effects, such as providing white characters on a black background, while maintaining the original webpage layout and enhancing the user's browsing experience.

BRIEF DESCRIPTION OF THE DRAWING(S)

DETAILED DESCRIPTION

Having thus described the present invention in general terms and in conjunction with the accompanying drawings, embodiments of the present invention are described below in more detail.

Figure 1:
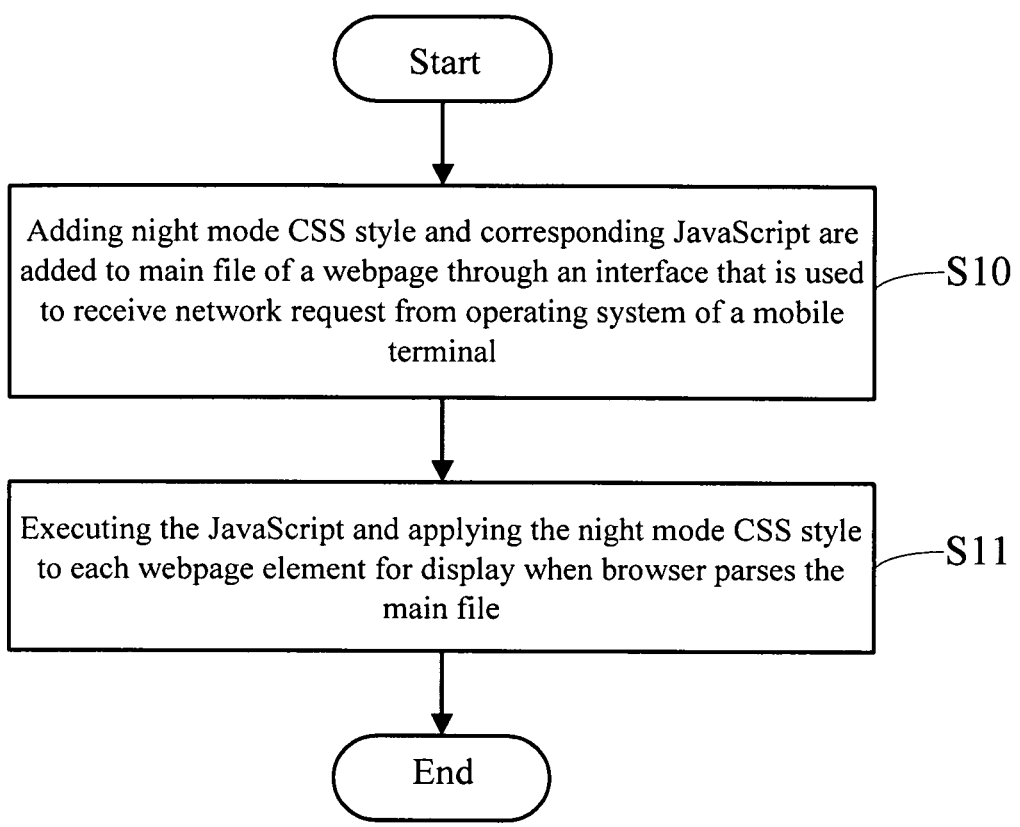
FIG. 1 illustrates a method for webpage processing in night mode in accordance with an embodiment.

FIG. 1 illustrates a process of a method for webpage processing in night mode in accordance with an embodiment. The method comprises:

Step S10: when a browser loads a webpage, night mode CSS style and corresponding JavaScript are added to the main file of a webpage through an interface that is used to receive a network request from an operating system of a mobile terminal.

The priority of the night mode CSS style is higher than that of the original CSS style.

Specifically, adding "important" property to the night mode CSS style makes the priority of the night mode CSS style higher than that of the original CSS style.

Step S11: When browser parses the main file, it executes the JavaScript and applies the night mode CSS style to each webpage element for display.

In this embodiment, the night mode CSS style and the corresponding JavaScript are added to the main file of the webpage when the browser loads the webpage. When the browser parses the main file, it executes the JavaScript and applies the night mode CSS style to each webpage element on the webpage to cover the original style of the webpage. In this way, it may provide better night display effects, such as providing white characters on a black background, while maintaining the original webpage layout and enhancing the user's browsing experience.

Figure 2:
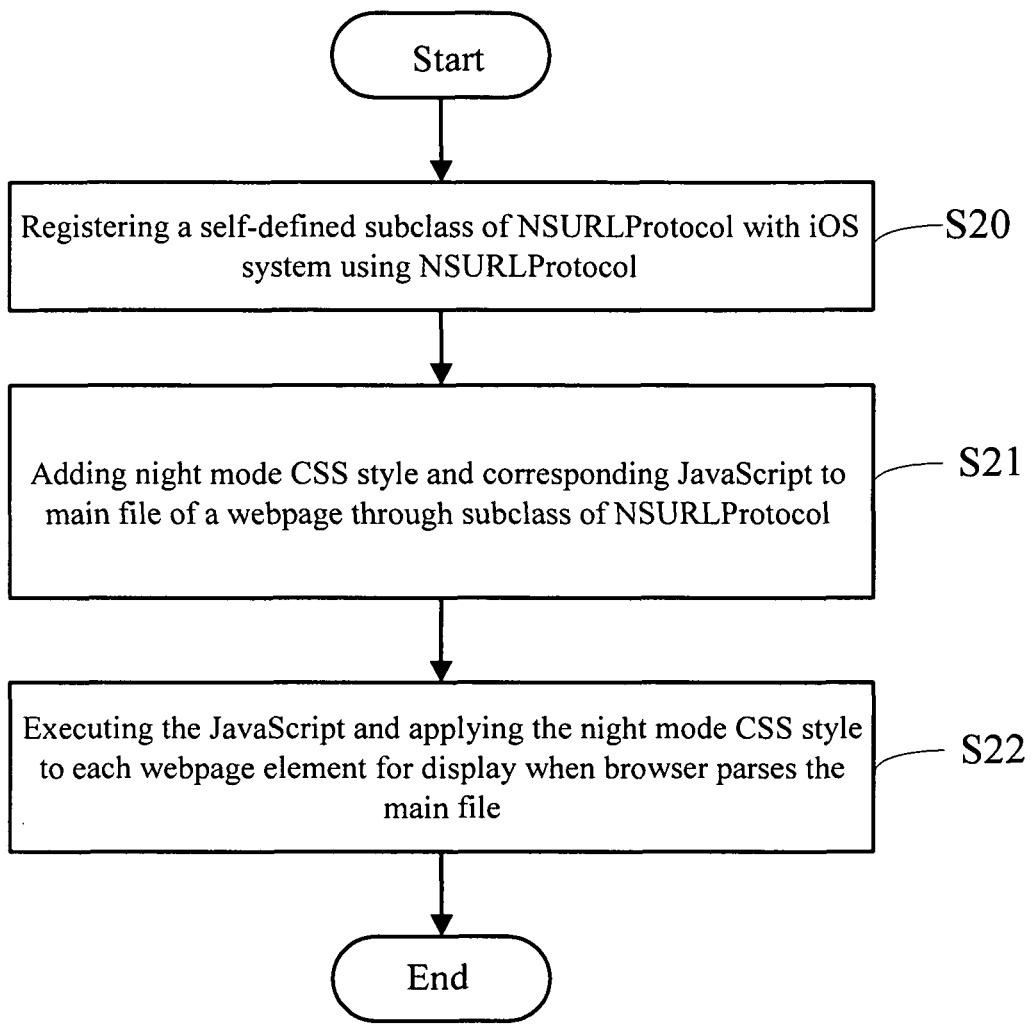
FIG. 2 illustrates a method for webpage processing in night mode in accordance with an embodiment.

FIG. 2 illustrates a process of a method for webpage processing in night mode in accordance with an embodiment. With reference to FIG. 2, before operation of Step S10, the method further comprises:

Step S20: Registering a self-defined subclass of NSURLProtocol with iOS system using NSURLProtocol.

Step S21: When browser loads a webpage, night mode CSS style and corresponding JavaScript are added to the main file of a webpage through subclass of NSURLProtocol.

Closed operating system, e.g. iOS, may be used on mobile terminals. Application of the closed operating system does not allow a third-party browser to access its own kernel (i.e. the kernel of such third-party browser). To provide opportunity for developers to process network related requests, the operating system provides a set of interfaces known as URL Loading System to process network related requests. In this embodiment, the method for webpage processing in night mode is implemented by using iOS operating system. The corresponding network related requests may be processed by registering a self-defined subclass of NSURLProtocol. For instance, the webpage processing in night mode may be implemented by registering a self-defined subclass of NSURLProtocol.

Specifically, after browser is launched and before a webpage is loaded, the self-defined NSURLProtocol subclass is registered with iOS operating system via NSURLProtocol+[NSURLProtocol registerClass:]. In this way, the NSURLProtocol subclass can process all network requests related to loading resource to webpage.

Further, during execution of step S21, the pre-registered NSURLProtocol is used to determine types of resource requests. When it is determined that the main file is requested, and if the night mode is launched, the CSS style of night mode and the corresponding JavaScript may be added to the main file and transmitted to the browser's kernel.

Step S22: When the browser parses the main file, it executes the JavaScript and applies the night mode CSS style to each webpage element for display.

Refer to corresponding description of FIG. 1 to facilitate further understanding of FIG. 2.

Figure 3:
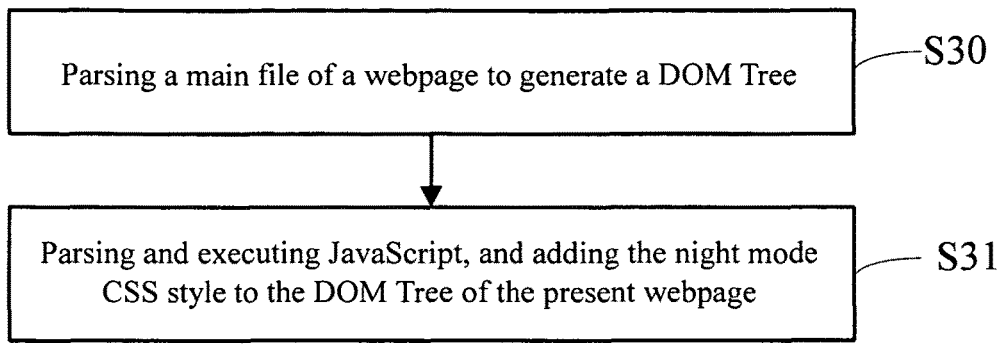
FIG. 3 illustrates a method of applying night mode CSS style in accordance with an embodiment.

FIG. 3 illustrates a process of a method of applying night mode CSS style in accordance with an embodiment. The method comprises:

Step S30: browser parses a main file of a webpage to generate a DOM (document object model) Tree.

Specifically, a DOM Tree of the webpage is generated by parsing the main file of the webpage and the resource cited in the main file.

Step S31: browser parses and executes JavaScript, and adds the night mode CSS style to the DOM Tree of the present webpage.

Specifically, during execution of JavaScript, the browser creates a style node, loads night mode CSS style to the style node, and adds the style node to the DOM Tree.

The night mode CSS style may be determined by a plurality of CSS style rules. The night mode CSS style may be classified into four types based upon the role CSS style plays in night mode processing. A detailed description is provided.

In the first type style rule, the night mode CSS style is applied to a first set nodes in the DOM Tree. Background color, frame color or text color of the first set nodes is set as the CSS style that has been preset by the first type style rule. Value of the first set nodes is predefined. For instance, if background color of html and body are black and gray in night mode, the background of html and body of the first type style rule is set as black and grey.

As the night mode CSS style of the first set nodes is preset, the first type style may be directly applied to the first set nodes to set style of these nodes in night mode.

Moreover, text color of all nodes and the CSS style of pseudo-element property of partial nodes may also be set by the first type style rule. For instance, except node labeled as "a" (node "a") and its descendent nodes, text color of all other nodes is always near-white in night mode. By the first type style rule, the text color of most nodes may be set as gray white. The text color of node "a" and its dependent nodes may be set as light blue. The color of node "a" that has been inspected and its dependent nodes may be set as light purple.

In the second type style rule, the night mode CSS style is applied to all nodes that have not been inspected (hereinafter "non-inspecting nodes") in the DOM Tree. Background color, frame color or text color of the non-inspecting nodes are set as the CSS style that are preset by the second type style rule.

The background color and the frame color preset by the second type style rule is the default background color and frame color. Normally the default background color and frame color is black and gray respectively. As it is time-consuming to inspect all the nodes, setting background color and frame color of all non-inspecting nodes as default background color and frame color by the second type style rule may avoid displaying the original style of the webpage before entering the night mode, thereby enhancing the user's browsing experience.

In the third type style rule, the night mode CSS style is applied to special nodes in the DOM Tree. When inspecting each displayable node in the DOM Tree, attributes, such as a first class or style property, may be added to the special nodes to acquire original style of the special nodes. Background color and frame color of the special node is set as night mode CSS style that has been preset by the third type style rule when the property of the original style satisfies preset conditions.

In this embodiment, the special nodes have special background color, frame color or text color which are set by CSS style ID or class selector. For instance, the special nodes may have a highlighted white or near-white background color, a background image, a gradient, semitransparent, or fully transparent background, a highlighted white or near-white frame color and other special properties. In another embodiment, the special nodes may also be set with a special background color, frame color or text color style by other means.

As all nodes are set with default background color and frame color by the second type of style, as described above, the background color of all webpage elements, including these special nodes, is set as nontransparent black and gray. Since the fully transparent, semitransparent and gradient background color, the background image and the frame color of these special nodes are all set to black and gray which is identical or close to background color of black and grey the original structure of the webpage is changed. All nodes may be inspected to recover the special properties of these special nodes.

For these special nodes, calculating property values of the original style may determine whether to change the style that is set by the second type style rule into a special style, such as whether to retain or delete the background image, whether to add transparent property to night mode, whether to change frame color, and whether to attribute to a node fully-transparent class property.

Specifically, when inspecting each displayable node in the DOM Tree, attributes, such as the first class or style property may be added to the special nodes. The second type style rule may use NOT selector to select nodes that have no such attributes in the DOM Tree to avoid these special nodes being selected by the second type style rule when inspecting nodes. As a result, properties of their original style may remain for these special nodes. For instance, the second type style rule may use *:not(.ucbrowser_unnic_class) to select nodes that have no attribute of ucbrowser_unnic_class or use *not:([ucbrwoser_unnic_prop]) to select nodes that have no attribute of ucbrwoser_unnic_prop.

Further, using "getComputedStyle" to acquire original style of these special nodes and using preset threshold value or preset regular expressions may determine whether property value of original style of a special node exceeds the preset threshold value or satisfies a predefined regular expression. If property value of original style of a special node exceeds the preset threshold value or satisfies a predefined regular expression, style property of the special node needs to be changed. Attributes, such as a second class or style property, may be added to the special node or each special property of the special node, allowing the special node to be selected by the third type style rule. For instance, when property value of the original style of this special node exceeds preset threshold value, it is determined to delete background image and set the background as semitransparent, thereby adding second class ucbrowser_delBgImg class and ucbrowser_changeBgLinear class to the special node. When the background color of the original style of this special node satisfies preset regular expression RegExp ('rgba\\(\\s*nd+ns*?,\\s*nd+ns*?,\\s*nd+ns*?,\\s*?0\\s*?\\)', 'i'), it is determined that the background of this special node is a transparent background, thereby adding mark to the special node to mark that the special node needs a transparent background. For instance, an attribute of the second class may be ucbrowser_transparentBkg class. Similarly, the second class may be set as ucbrowser_transparentBkg class when the special node has a mark that indicates transparent background is required.

In this embodiment, special nodes having attributes of the second class or property may be selected by class or property selector. Night mode background color, frame color, transparency or mark which marks that the special node may have a special property may also be set by class or property selector.

For one instance, style rule of .ucbrowser_delBgImg{background-image:none !important;} may be employed to set no background image for a node. Style rule of .ucbrowser_changeBgLinear{background: rgba (40,40,40,0.6)!important;} may be employed to set a semitransparent background for a node. Style rule of .ucbrowser_changeBorder{border-color: #414c61 !important;} may be employed to set frame color of a webpage element. Style rule of .ucbrowser_transparentBkg{ } may be employed to mark that a node needs a transparent background.

For another instance, color with an RGB color component value over 160 may be preset to be white or near-white. When frame color of the original style of a node satisfies this condition (preset threshold value), the second class ucbrowser_changeBorder may be added to this node so that this node can be selected by .ucbrowser_changeBorder{border-color: #414c61 !important;} of the third type style rule, thereby setting the frame color to deep gray and blue. If properties of background image include RGB or -webkit-gradient (preset regular expression), the node may have a gradient background. The second class ucbrowser_changeBgLinear may be added to this node so that this node can be selected by .ucbrowser_changeBgLinear{background: rgba(40,40,40, 0.6)!important;} of the third type style rule, thereby implementing semitransparent effect in night mode.

Before inspecting nodes in the DOM Tree, no node is selected by the third type style rule.

After adding night mode properties to the special nodes by application of the third type style rule, attributes, such as a third class or property, to indicate night mode style has been added to this node. For instance, ucbrowser_process_done class may be added to a node having night mode style.

In the fourth type style rule, the night mode CSS style is applied to a second set nodes in the DOM Tree. Each displayable node in the DOM Tree may be inspected to acquire the second set nodes. Settings of the night mode CSS style of the second set nodes include background color, frame color or text color that are preset by the fourth type style rule. The second set nodes may be set to include attributes of the third class or property but exclude second class or property. In other words, when a node is not set to have night mode style that has been set by the first or third type style rules the fourth type style rule may be applied to the node.

When the first, second, and third type style rules are used to set night mode style of a node, attributes of second class or property have been added to special nodes and corresponding CSS style has been added to the special node. A mark may also be added to special nodes having attributes of second class or property to indicate that the special node may have a special property. Nodes to which no attributes of second class or property have been added have no special property of background color, frame color or transparency, indicating that no night mode CSS style has been set to these nodes.

Specifically, in the fourth type style rule, class or property selector may be used to select nodes that have attributes of the third class or property to determine nodes that have been inspected (hereinafter "inspected nodes"). Then ":not" selector may be used to distinguish nodes to which no attributes of the second class or property have been added (hereinafter "distinguished nodes") from the inspected nodes. Then background color, frame color and text color of these distinguished nodes may be set as the night mode CSS style that has been preset by the fourth type style rule.

For instance, background color of div node is not set by the first type style rule. The div node has attribute of the third class which is class ucbrowser_process_done, indicating that the night mode style has been added to the element. The div node does not have attributes of the second class, indicating that the element does not have property of transparent, gradient, white or near-white background. In this case, the background of this div node may be in black and gray in night mode. By the fourth type style rule, the background color of this div node may be set as black and gray by div.ucbrowser_process_done:not(ucbrowser_transparentkg):not(.ucbrowser_changeBgLinear):not(ucbrowser_setBackground){background-color: #353840 !important;}.

As a result, if a node has no transparent, semitransparent or transient background and if background and frame color are not set by the first type style rule, the background may be set black and gray and the frame may be set light blue by the fourth type style rule.

When all nodes in the DOM Tree have been set by one or more of the style rules, the entire webpage may display night mode effects.

Further, since the DOM Tree of a webpage may include a plurality of nodes, inspecting all nodes at one time may cause a server to stop responding to a user's gesture, thus causing delay rendering the inspected nodes. In this embodiment, nodes may not be inspected at one time. In other words, only part of the nodes are inspected at a time. A short period may be added to wait for response from user interface (UI) to allow the inspected nodes to be rendered without long delay.

Figure 4:
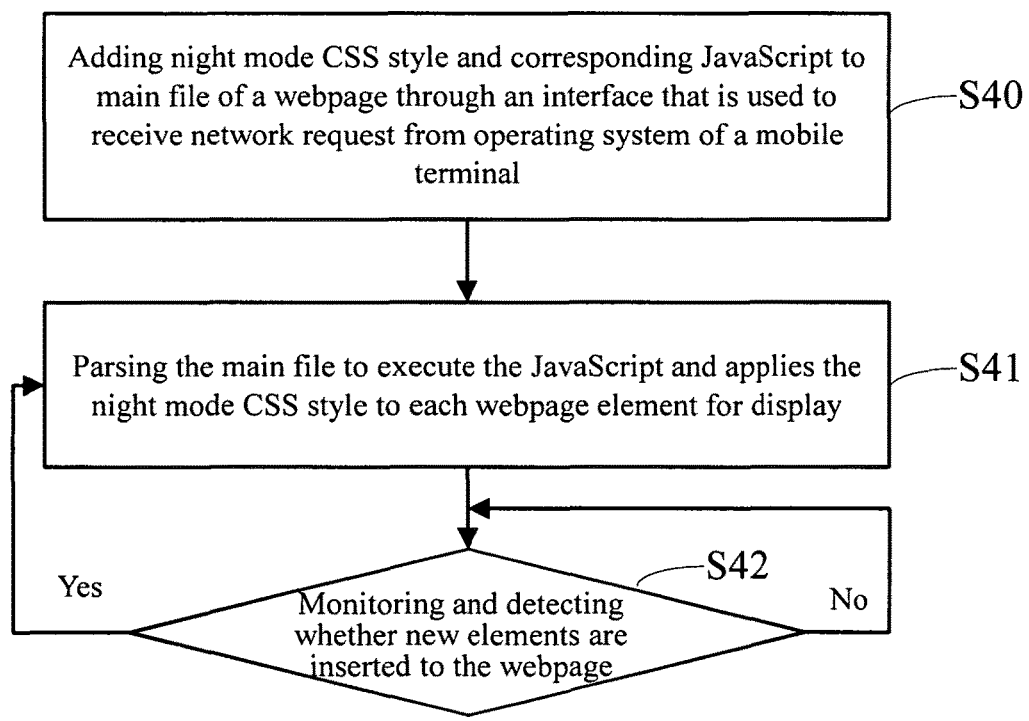
FIG. 4 illustrates a method for webpage processing in night mode in accordance with an embodiment.

FIG. 4 illustrates a method for webpage processing in night mode in accordance with an embodiment. The method comprises:

Step S40: When browsers load a webpage, night mode CSS style and corresponding JavaScript are added to the main file of a webpage through an interface that is used to receive network request from operating system of a mobile terminal.

Step S41: When the browser parses the main file to execute the JavaScript and applies the night mode CSS style to each webpage element for display.

Step S42: Browser monitors and detects whether new elements are inserted to the webpage. If new elements are detected, the method returns to step S41. Otherwise, browser keeps monitoring the webpage at this step.

Specifically, browser monitors a webpage by registering DOMNodeInserted event. When browser detects new elements, such as a popup menu or submenu, the method proceeds to step S41. The night mode CSS style is applied to each new element for display.

Refer to corresponding description of FIG. 1 and FIG. 2 to facilitate further understanding of FIG. 4.

Figure 5:
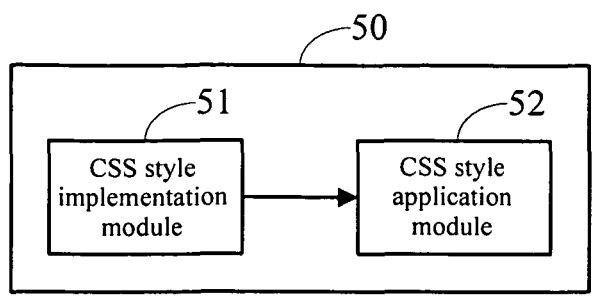
FIG. 5 illustrates a structural diagram of a device for webpage processing in night mode in accordance with an embodiment.

FIG. 5 illustrates a structural diagram of a device 50 for webpage processing in night mode in accordance with an embodiment. The device 50 comprises a CSS style implementation module 51 and a CSS style application module 52.

When browsers load a webpage, the CSS style implementation module 51 is configured to add night mode CSS style and corresponding JavaScript to the main file of a webpage through an interface that is used to receive a network request from the operating system of a mobile terminal. The priority of the night mode CSS style is higher than that of the original CSS style. Specifically, the CSS style implementation module 51 is configured to add "important" property to the night mode CSS style to make the priority of the night mode CSS style higher than that of the original CSS style.

The CSS style application module 52 is configured to parse the main file and execute the JavaScript and apply the night mode CSS style to each webpage element for display.

In this embodiment, the night mode CSS style and the corresponding JavaScript are added to the main file of the webpage when browser loads the webpage. When the browser parses the main file, the CSS style application module 52 executes the JavaScript and applies the night mode CSS style to each webpage element on the webpage to cover the original style of the webpage. In this way, it may provide better night display effects, such as providing white characters on a black background, while maintaining the original webpage layout and enhancing the user's browsing experience.

Figure 6:
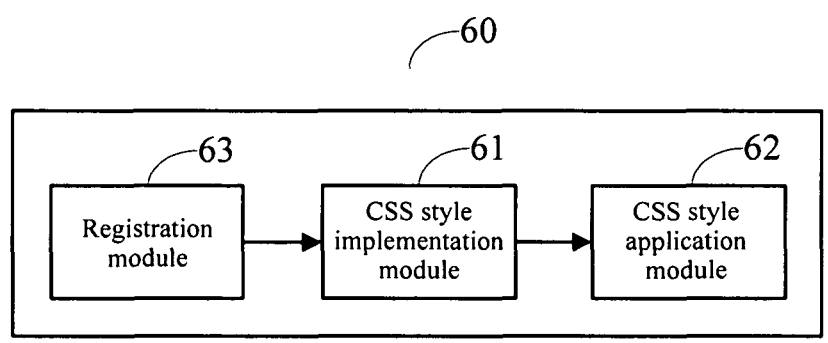
FIG. 6 illustrates a structural diagram of a device for webpage processing in night mode in accordance with an embodiment.

FIG. 6 illustrates a structural diagram of a device 60 for webpage processing in night mode in accordance with an embodiment. The device 60 comprises a CSS style implementation module 61, a CSS style application module 62 and a registration module 63.

The registration module 63 is configured to register the self-defined subclass of NSURLProtocol with iOS system via NSURLProtocol. Specifically, after the browser is launched and before the browser loads a webpage, registration module 63 registers the self-defined NSURLProtocol subclass with iOS operating system via NSURLProtocol+ [NSURLProtocol registerClass:]. In this way, the NSURLProtocol subclass can process all network requests relating to webpage resource loading.

The CSS style implementation module 61 is configured to add night mode CSS style and corresponding JavaScript to the main file of a webpage.

The CSS style application module 62 is configured to parse the main file of a webpage and execute JavaScript and apply the night mode CSS style to DOM tree of the webpage.

Specifically, the CSS style application module 62 parses the main file of a webpage and sub-resources cited in the main file to generate a DOM tree of this webpage. During execution of the JavaScript performed by the CSS style application module 62, the CSS style application module 62 creates a style node, adds night mode CSS style to the style node, and adds the style node to the webpage DOM Tree.

The night mode CSS style comprises a plurality of CSS style rules. The night mode CSS style may be classified into four types based upon the role CSS style plays in night mode processing. A detailed description is provided to describe how the CSS style application module 62 is configured to parse and execute JavaScript and apply the night mode CSS style to DOM tree of the webpage.

In the first type style rule, the CSS style application module 62 applies the night mode CSS style to a first set nodes in the DOM Tree. The CSS style of the first set nodes is set as the background color, frame color or text color preset by the first type style rule. Value of the first set nodes is predefined.

In the second type style rule, the CSS style application module 62 applies the night mode CSS style to all nodes that have not been inspected (hereinafter is referred as "non-inspecting nodes") in the DOM Tree. Background color, frame color and text color of these non-inspecting nodes are set as the night mode CSS style that has been preset by the second type style rule.

The background color and the frame color preset by the second type style rule is the default background color and frame color. Normally the default background color and frame color is black and gray respectively.

In the third type style rule, the night mode CSS style is applied to special nodes in the DOM Tree. The CSS style application module 62 is configured to inspect each displayable node in the DOM Tree, attributes, such as a first class or style property, may be added to the special nodes to acquire original style of the special nodes. Background color and frame color of the special node is set as night mode CSS style that has been preset by the third type style rule when the property of the original style satisfies preset conditions. In this embodiment, the special nodes have special background color, frame color or text color which are set by CSS style ID or class selector. For instance, the special nodes may have a highlighted white or near-white background color, a background image, a gradient, semitransparent, or fully transparent background, a highlighted white or near-white frame color and other special properties.

Specifically, when the CSS style application module 62 inspects each displayable node in the DOM Tree, attributes, such as the first class or style property may be added to the special nodes. The second type style rule may use NOT selector to select nodes that have no such attributes in the DOM Tree to avoid these special nodes being selected by the second type style rule when inspecting nodes. As a result, properties of their original style may be remained for these special nodes.

Further, the CSS style application module 62 may employ "getComputedStyle" to acquire original style of these special nodes and use preset threshold value or preset regular expressions may determine whether property value of original style of a special node exceeds the preset threshold value or satisfies a predefined regular expression. If property value of original style of a special node exceeds the preset threshold value or satisfies a predefined regular expression, style property of the special node needs to be changed. Attributes, such as a second class or style property, may be added to the special node or each special property of the special node, allowing the special node to be selected by the third type style rule. In this embodiment, special nodes having attributes of the second class or property may be selected by class or property selector. Night mode background color, frame color, transparency or mark which marks that the special node may have a special property may also be set by class or property selector.

For one instance, color with an RGB color component value over 160 may be preset to be white or near-white. When frame color of the original style of a node satisfies this condition (preset threshold value), the second class ucbrowser_changeBorder may be added to this node so that this node can be selected by .ucbrowser_changeBorder{border-color: #414c61 !important;} of the third type style rule, thereby setting the frame color to deep gray and blue. If properties of background image include RGB or -webkit-gradient (preset regular expression), the node may have a gradient background. The second class ucbrowser_changeBgLinear may be added to this node so that this node can be selected by .ucbrowser_changeBgLinear{background: rgba(40,40,40,0.6) !important;} of the third type style rule, thereby implementing semitransparent effect in night mode.

Before inspecting nodes in the DOM Tree, no node is selected by the third type style rule. After adding night mode properties to the special nodes by application of the third type style rule, attributes, such as a third class or property, to indicate night mode style has been added to this node.

In the fourth type style rule, the CSS style application module 62 may apply the night mode CSS style to a second set nodes in the DOM Tree. Each displayable node in the DOM Tree may be inspected to acquire the second set nodes. Settings of the night mode CSS style of the second set nodes include background color, frame color or text color that are preset by the fourth type style rule. The second set nodes may be set to include attributes of the third class or property but exclude second class or property.

Specifically, in the fourth type style rule, class or property selector may be used to select nodes that have attributes of the third class or property to determine nodes that have been inspected (hereinafter "inspected nodes"). Then ":not" selector may be used to distinguish nodes to which no attributes of the second class or property have been added (hereinafter "distinguished nodes") from the inspected nodes. Then background color, frame color and text color of these distinguished nodes are set to the night mode CSS style that has been preset by the fourth type style rule.

When all nodes in the DOM Tree have been set by one or more of the style rules, the entire webpage may display night mode effects.

Refer to corresponding description of FIG. 5 to facilitate further understanding of FIG. 6.

Figure 7:
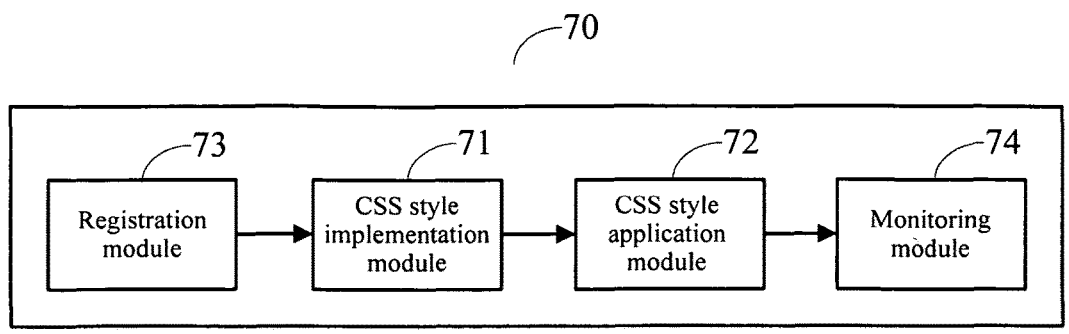
FIG. 7 illustrates a structural diagram of a device for webpage processing in night mode in accordance with an embodiment.

FIG. 7 illustrates a structural diagram of a device 70 for webpage processing in night mode in accordance with an embodiment.

The device 70 comprises a CSS style implementation module 71, a CSS style application module 72, a registration module 73 and a monitoring module 74.

The monitoring module 74 is configured to monitor and detect whether new elements are inserted to the webpage. Specifically, the browser monitors a webpage by registering DOMNodeInserted event. When the browser detects new elements, such as a popup menu or submenu, the method proceeds to step S41. The night mode CSS style is applied to each new element for display.

Refer to corresponding description of FIG. 6 to facilitate further understanding of FIG. 7.

Figure 8:
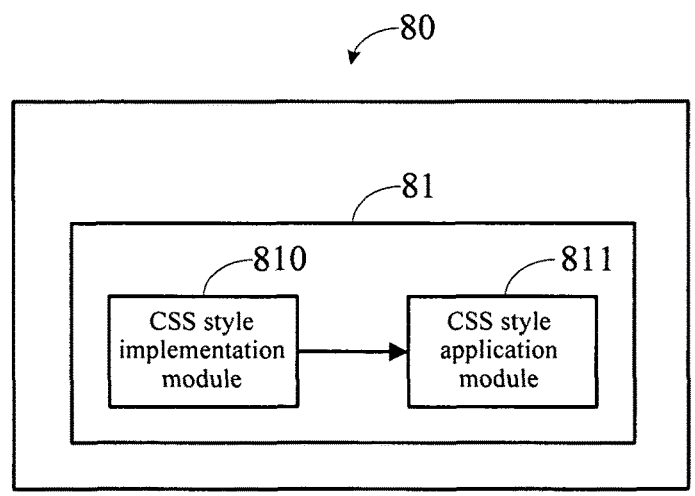
FIG. 8 illustrates a structural diagram of a mobile terminal for webpage processing in night mode in accordance with an embodiment.

FIG. 8 illustrates a structural diagram of a mobile terminal 80 for webpage processing in night mode in accordance with an embodiment. The mobile terminal 80 comprises a processing device 81. The processing device 81 comprises a CSS style implementation module 810 and a CSS style application module 811. Refer to FIG. 5 and its corresponding description.

In other embodiments, the processing device 81 may further comprise a registration module and/or a monitoring module. Refer to FIG. 6 and FIG. 7 and the corresponding text descriptions for these modules.

The method for webpage processing in night mode comprises adding night mode CSS style and corresponding JavaScript to the main file of a webpage when browsers load a webpage, executing the JavaScript and applying the night mode CSS style to each webpage element to cover the original style of the webpage when the browser parses the main file. In this way, it may provide better night display effects while maintaining the original webpage layout and enhancing the user's browsing experience.

The foregoing embodiments of this invention are for reference only and shall not restrict the scope of protection of this invention. All equivalent structural or procedural changes made on the basis of the specifications and drawings herein and all direct or indirect applications of this invention in any other relevant technical fields shall be within the scope of protection of this invention.

That which is claimed:

1. A computer-implemented method for webpage processing in a night mode, wherein the method comprises:
    injecting, by a browser using an interface of network request processing of a terminal operating system, a plurality of CSS styles of the night mode and a corresponding script code into a main file of a webpage when the browser is loading the webpage, wherein a priority of the plurality of CSS styles of the night mode is higher than a priority of an original CSS style of the main file, wherein said plurality of CSS styles of the night mode comprise a first type of CSS style of the night mode, a second type of CSS style of the night mode, and a third type of CSS style of the night mode; and
    parsing, by the browser, said main file, executing said corresponding script code and applying said plurality of CSS styles of the night mode to webpage elements of said webpage for display, comprising:

generating, by the browser, a webpage Dom Tree based on the parsed main file;

modifying said webpage Dom Tree by adding said plurality of CSS styles of the night mode to said webpage Dom Tree, comprising:

setting CSS style of a first set node of the webpage Dom Tree as background color, frame color or text color designated by said first type of CSS style of the night mode, said first set node having pre-defined CSS style of the night mode;

setting CSS style of non-inspecting nodes of the webpage Dom Tree as background color or frame color designated by said second type of CSS style of the night mode;

applying said third type of CSS style at a special node of the webpage Dom Tree, said special node having a white background color or a white frame color style, comprising:

adding a first class to said special node when traversing each displayable node of said webpage Dom Tree, acquiring an original style of said special node, and based on a property of said original style satisfying a preset condition:

adding a second class to said special node, and setting CSS style of said special node as background color and frame color designated by said third type of CSS style of the night mode.

2. The computer-implemented method for webpage processing in night mode of claim 1, wherein, before the step of injecting, by the browser, the plurality of CSS styles of the night mode and the corresponding script code into the main file of said webpage via the interface of network request processing as provided by the terminal operating system when the browser is loading the webpage, said method further comprises:

registering a self-defined subclass of NSURLProtocol with iOS system via NSURLProtocol;

wherein injecting, by the browser, the plurality of CSS styles of the night mode and the corresponding script code into the main file of said webpage via the interface of network request processing as provided by the terminal operating system when the browser is loading the webpage further comprises:

injecting, by the browser, the plurality of CSS styles of the night mode and the corresponding script code into the main file of said webpage via said subclass of NSURLProtocol.

3. The computer-implemented method for webpage processing in night mode of claim 1, wherein said preset condition is a property value of said original style being higher than a preset threshold value or satisfying a preset regular expression.

4. The computer-implemented method for webpage processing in night mode of claim 1, wherein the step of setting the CSS style of said special node as the background color and frame color designated by said third type of CSS style of the night mode comprises:

based on said third type of CSS style of the night mode, selecting special node with said second class, setting the CSS style of said special node as the background color and frame color designated by said third type of CSS style; and subsequent to setting the CSS style of said special node, adding a third class to said special node.

5. The computer-implemented method for webpage processing in night mode of claim 4, wherein the step of parsing and executing, by the browser, said corresponding script code and adding said plurality of CSS styles in the night mode to said webpage Dom Tree comprises:

based on said plurality of CSS styles of the night mode comprising a fourth type of CSS style of the night mode applied to a second set node of said webpage Dom Tree, traversing each displayable node of said webpage Dom Tree to acquire said second set node and setting CSS style of said second set node as background color, frame color and text color designated by said fourth type of CSS style of the night mode, wherein said second set node is with said third class and without said second class.

6. The computer-implemented method for webpage processing in night mode of claim 1, wherein, after the step of parsing, by the browser, said main file, executing said corresponding script code and applying said plurality of CSS styles of the night mode to the webpage elements of said webpage for display, said method further comprises:

monitoring whether said webpage is inserted with a new webpage element; and based on said webpage being inserted with the new webpage element, parsing, by the browser, said main file, executing said corresponding script code and applying said plurality of CSS styles of the night mode to the new webpage element of said webpage for display.

7. An apparatus for webpage processing in a night mode, comprising at least one processor and at least one non-transitory memory including computer program code, the at least one non-transitory memory and the computer program code configured to, with the at least one processor, cause the apparatus to at least:

inject a plurality of CSS styles of the night mode and a corresponding script code into a main file of a webpage via an interface of network request processing of an operating system, wherein a priority of the plurality of CSS styles of the night mode is higher than a priority of an original CSS style of the main file, wherein said plurality of CSS styles of the night mode comprise a first type of CSS style of the night mode, a second type of CSS style of the night mode, and a third type of CSS style of the night mode; and parse said main file, executing said corresponding script code and applying said plurality of CSS styles of the night mode to webpage elements of said webpage for display, comprising:

generating a webpage Dom Tree based on the parsed main file;

modifying said webpage Dom Tree by adding said plurality of CSS styles of the night mode to said webpage Dom Tree, comprising:

setting CSS style of a first set node of the webpage Dom Tree as background color, frame color or text color designated by said first type of CSS style of the night mode, said first set node having pre-defined CSS style of the night mode;

setting CSS style of non-inspecting nodes of the webpage Dom Tree as background color or frame color designated by said second type of CSS style of the night mode;

applying said third type of CSS style at a special node of the webpage Dom Tree, said special node having a white background color or a white frame color style, comprising:
    adding a first class to said special node when traversing each displayable node of said webpage Dom Tree,
    acquiring an original style of said special node, and
    based on a property of said original style satisfying a preset condition:
        adding a second class to said special node, and setting CSS style of said special node as background color and frame color designated by said third type of CSS style of the night mode.

8. The apparatus for webpage processing in a night mode of claim 7, wherein the at least one non-transitory memory including the computer program code is further configured to, with the at least one processor, cause the apparatus to:
    register a self-defined subclass of NSURLProtocol with iOS system via NSURLProtocol; and
    inject the plurality of CSS styles of the night mode and the corresponding script code into the main file of said webpage via said subclass of NSURLProtocol.

9. The apparatus for webpage processing in night mode of claim 7, wherein, based on said plurality of CSS styles in the night mode comprising a fourth type of CSS style in the night mode applied to a second set node of said webpage Dom Tree, the at least one non-transitory memory including the computer program code is further configured to, with the at least one processor, cause the apparatus to:
    traverse each displayable node of said webpage Dom Tree to acquire said second set node; and
    set CSS style of said second set node as background color, frame color and text color designated by said fourth type of CSS style of the night mode, wherein said second set node is with third class and without said second class.

* * * * *